United States Patent
Pascoguin et al.

(10) Patent No.: US 11,646,795 B1
(45) Date of Patent: May 9, 2023

(54) ELECTROMAGNETIC COMMUNICATION WITH A VORTEX BEAM CONCURRENTLY CONVEYING MULTIPLE TOPOLOGICAL CHARGES

(71) Applicant: The United States of America, as represented by the Secretary of the Navy, San Diego, CA (US)

(72) Inventors: Bienvenido Melvin L. Pascoguin, San Diego, CA (US); Brittany Lynn, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/535,281

(22) Filed: Nov. 24, 2021

(51) Int. Cl.
*H04B 10/27* (2013.01)
*G02B 27/42* (2006.01)

(52) U.S. Cl.
CPC ......... *H04B 10/27* (2013.01); *G02B 27/4233* (2013.01)

(58) Field of Classification Search
CPC .............. H04B 10/27; H04B 10/2507; G02B 27/4233; H04J 14/02
See application file for complete search history.

(56) References Cited

U.S. PATENT DOCUMENTS

| | | | |
|---|---|---|---|
| 2016/0360605 A1* | 12/2016 | Clark | G21K 1/16 |
| 2017/0343750 A1* | 11/2017 | Ashrafi | H04J 14/04 |
| 2018/0069631 A1* | 3/2018 | Ashrafi | G02B 6/2726 |
| 2022/0050389 A1* | 2/2022 | Jäckel | G03F 7/70733 |

OTHER PUBLICATIONS

Moreno, Ignacio, et al. "Vortex sensing diffraction gratings." Optics Letters 34.19 (2009): 2927-2929.
Moreno, Ignacio, et al. "Decomposition of radially and azimuthally polarized beams using a circular-polarization and vortex-sensing diffraction grating." Optics Express 18.7 (2010): 7173-7183.

* cited by examiner

*Primary Examiner* — Dzung D Tran
(74) *Attorney, Agent, or Firm* — Naval Informaton Warfare Center, Pacific; Kyle Eppele; James McGee

(57) ABSTRACT

A system for electromagnetic communication with a vortex beam concurrently conveys multiple topological charges of orbital angular momentum. The system includes a source, at least one vortex-sensing diffraction grating, and an array of photodetectors. The source generates the vortex beam concurrently conveying a respective number of selected topological charges during each of the time intervals. The selected topological charges for each time interval are selected from a set of available topological charges. The selected topological charges for each time interval encode a symbol of data. The vortex-sensing diffraction grating combines a vortex phase pattern and a linear phase pattern. The vortex sensing diffraction grating produces a diffraction pattern from diffracting the vortex beam received from the source. The array of photodetectors detects portions of the diffraction pattern and from the detected portions recovers the selected topological charges encoding the symbol of each time interval.

20 Claims, 5 Drawing Sheets

ELECTROMAGNETIC COMMUNICATION WITH A VORTEX BEAM CONCURRENTLY CONVEYING MULTIPLE TOPOLOGICAL CHARGES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 107438.

BACKGROUND OF THE INVENTION

Data communication typically encodes data into symbols serially transmitted one bit at a time. Data throughput can be increased by simultaneously transmitting multiple bits, such as simultaneously sending a bit over each of multiple parallel wires. There is a general need to increase data throughput over communication interfaces. There is also a general need for data communications with encodings that are unique to increase the security of the data communication.

SUMMARY

A system for electromagnetic communication with a vortex beam concurrently conveys multiple topological charges of orbital angular momentum. The system includes a source, at least one vortex-sensing diffraction grating, and an array of photodetectors. The source generates the vortex beam concurrently conveying a respective number of selected topological charges during each of the time intervals. The selected topological charges for each time interval are selected from a set of available topological charges. The selected topological charges for each time interval encode a symbol of data. The vortex-sensing diffraction grating combines a vortex phase pattern and a linear phase pattern. The vortex sensing diffraction grating produces a diffraction pattern from diffracting the vortex beam received from the source. The array of photodetectors detects portions of the diffraction pattern and from the detected portions recovers the selected topological charges encoding the symbol of each time interval.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Embodiments of the invention encode data symbols that include many binary bits of information transmitted concurrently in a beam of electromagnetic energy, such as a light beam or a radiofrequency beam. The concurrent transmission of a symbol including multiple binary bits increases the throughput of the electromagnetic communication. Each symbol is encoded in multiple topological charges of orbital angular momentum conveyed concurrently in the electromagnetic communication. This encoding in multiple topological charges of orbital angular momentum is also unique, which increases the security of the electromagnetic communication even when the electromagnetic communication is intercepted during eavesdropping.

Figure 1:
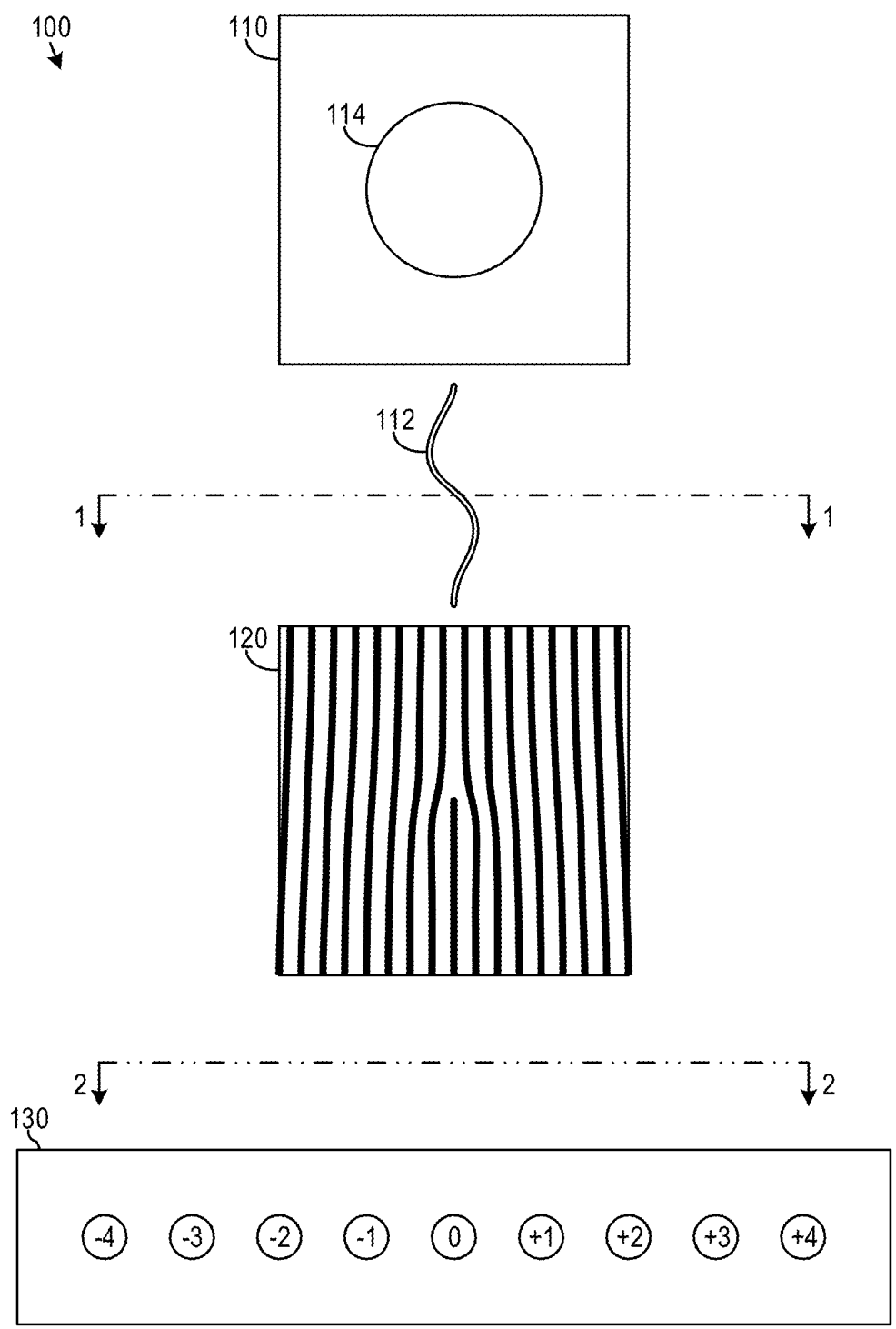
FIG. 1 is a block diagram of a system for electromagnetic communication with a vortex beam concurrently conveying multiple topological charges of orbital angular momentum in accordance with an embodiment of the invention.

FIG. 1 is a block diagram of a system 100 for electromagnetic communication with a vortex beam concurrently conveying multiple topological charges of orbital angular momentum in accordance with an embodiment of the invention. During successive time intervals, a symbol of data is encoded in the multiple topological charges of orbital angular momentum that the vortex beam conveys in each time interval. The particular topological charges conveyed during a particular time interval collectively specify an encoding of the symbol of data. Because many combinations of topological charges are possible, multiple binary bits of data can be concurrently encoded in the topological charges selected for each time interval.

A source 110 generates the vortex beam conveyed through free space or through an optional multimode optical fiber 112 from the source 110 to the vortex-sensing diffraction grating 120. Typically, the vortex-sensing diffraction grating 120 is disposed at a distance from the source 110 to form a segment of a telecommunications network. During each time interval within a sequence of time intervals, the vortex beam concurrently conveys multiple topological charges selected from a set of available topological charges. In one embodiment, the source 110 includes a spatial light modulator 114 having regions that each provide one of the available topological charges during each of the time intervals, and hence the number S of selected topological charges for each of the time intervals is fixed at a number of the regions of the spatial light modulator 114. More generally, the number of the topological charges selected for each time interval is dynamically variable, but includes at least two selected topological charges for at least one of the time intervals.

Figure 2:
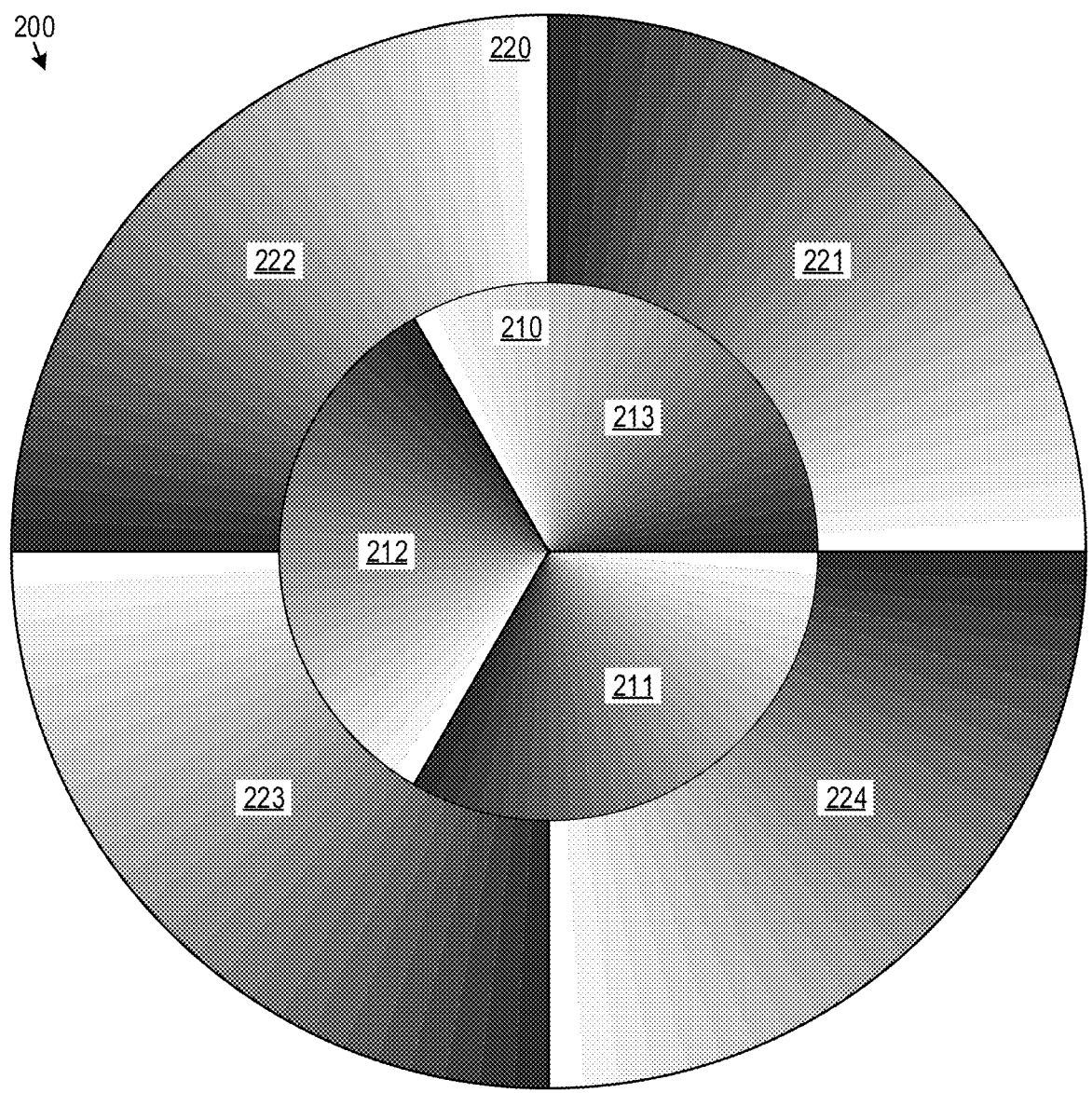
FIG. 2 is an example cross section through a vortex beam in accordance with an embodiment of the invention.

FIG. 2 is an example cross section 200 through a vortex beam in accordance with an embodiment of the invention.

When optional multimode optical fiber 112 is omitted, the vortex beam is collimated through free space and has the circular cross section 200 at section 1-1 of FIG. 1. Alternatively or additionally, the vortex beam has the circular cross section 200 at the spatial light modulator 114 of FIG. 1.

The example circular cross section 200 is partitioned into two regions, a central circular region 210 and a concentric annular region 220 surrounding the central circular region 210. Within each of the regions 210 and 220, the relative phase of the vortex beam is shown with the white shade corresponding to a phase delay of zero and the darkest shade corresponding to a phase delay of nearly $2\pi$ radians. The inner region 210 has three complete helical cycles 211, 212, and 213 of phase increasing clockwise, and the outer region 220 has four complete helical cycles 221, 222, 223, and 224 of phase increasing counterclockwise. The three complete helical cycles 211, 212, and 213 of phase increasing clockwise of inner region 210 is denoted a topological charge of −3 with the minus sign denoting clockwise increasing phase, and the four complete helical cycles 221, 222, 223, and 224 of phase increasing counterclockwise of the outer region 220 is denoted a topological charge of +4 with the plus sign denoting counterclockwise increasing phase. Thus, the example circular cross section 200 is partitioned into the central circular region 210 with topological charge −3 and the concentric annular region 220 with topological charge +4.

FIG. 2 shows the example topological charges of −3 and +4 for two regions 210 and 220, respectively. There are more than two regions in other embodiments. Typically, the topological charge of each of the regions 210 and 220 is an integer value with an absolute value ranging between 0 and a maximum allowed topological charge M; however, non-integer topological charges are possible, but correspond to incomplete cycles of phase increasing clockwise or counterclockwise. A topological charge of zero in a region 210 or 220 corresponds to an electromagnetic beam with the same phase across that region of the cross section 200, such as the unmodulated plane wave emitted from a typical laser.

In FIG. 2, the central region 210 has a radius that is about half the outer radius of the annular region 220. Thus, the annular region 220 has twice the area of the central region 210. This is appropriate for an electromagnetic beam having decreased intensity in the outer annular region 220, such as a light beam with a Gaussian profile.

Figure 3:
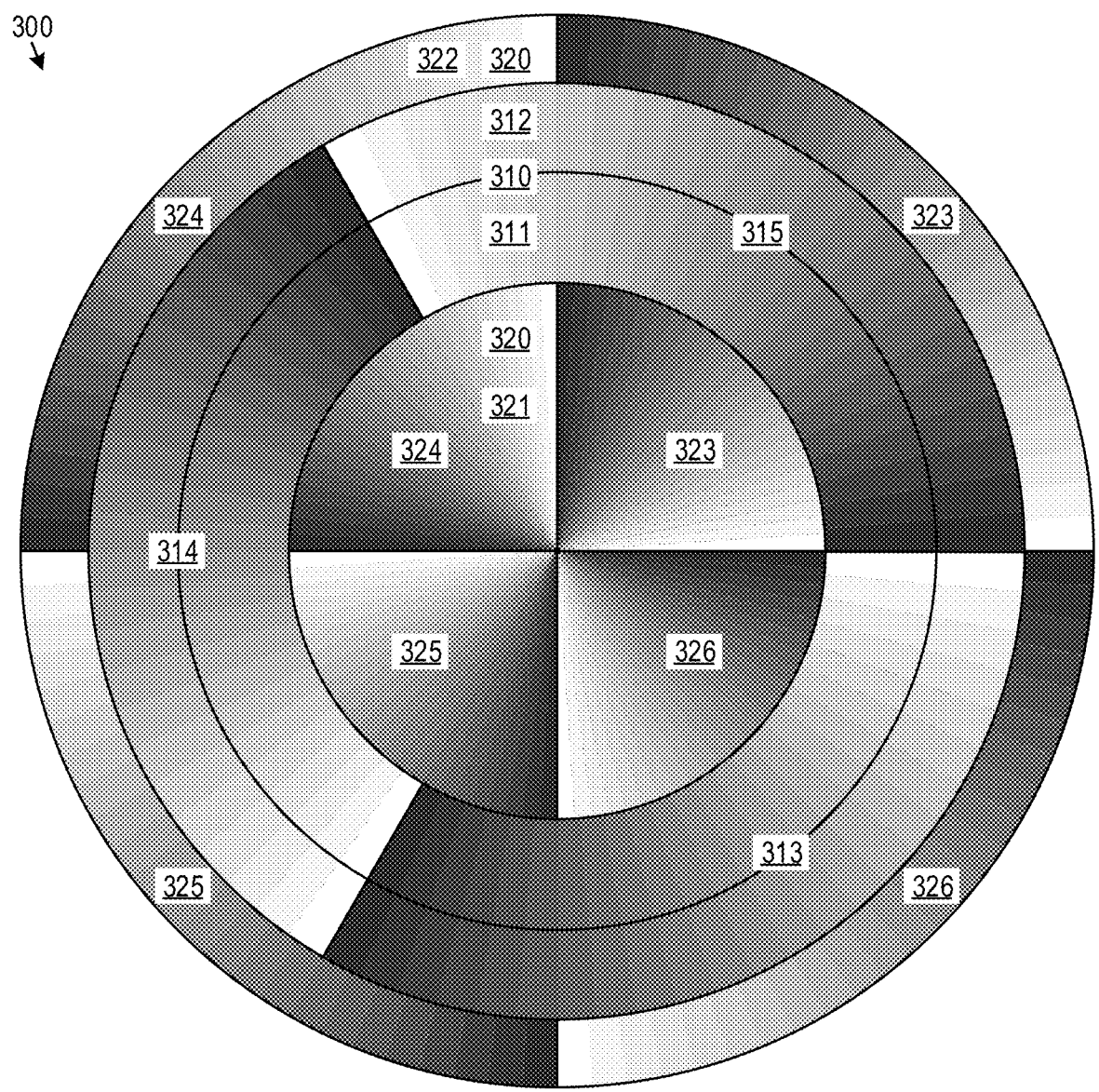
FIG. 3 is an example cross section through a vortex beam in accordance with an embodiment of the invention.

FIG. 3 is an example cross section 300 through a vortex beam in accordance with an embodiment of the invention. Like FIG. 2, FIG. 3 shows two regions 310 and 320, but each spread over two subregions. Region 310 includes subregions 311 and 312 together having three complete helical cycles 313, 314, and 315 of phase increasing clockwise. Region 320 includes subregions 321 and 322 together having four complete helical cycles 323, 324, 325, and 326 of phase increasing counterclockwise.

In FIG. 3, each of the subregions 311, 312, 321, and 322 have equal area. This is appropriate for a light beam having the same intensity across the cross section 300. Because the outermost subregion 322 most efficiently conveys angular orbital momentum and the innermost subregion 321 least efficiently conveys angular orbital momentum, these two subregions 321 and 322 are allocated to the same region 320. In an embodiment with more than two regions, there are at least twice as many subregions as regions, with the innermost and outermost subregions allocated to the same region, the next innermost and next outermost subregions allocated to the same region, and so on to equalize the angular orbital momentum conveyed in each of the regions.

Returning to FIG. 1, the spatial light modulator 114 of an embodiment of the invention imparts the helical cycles of phase onto an electromagnetic beam with uniform phase, such as the unmodulated plane wave emitted from a typical laser. The spatial light modulator 114 is either transmitting or reflecting in embodiments of the invention. For example, a transmitting spatial light modulator 114 adjusts the phase with the tilt angle of a liquid crystal have rod-like molecules with different refractive indices along the length and across the length of the rod-like molecules, and a reflecting spatial light modulator 114 adjusts the phase with an array of piston-displaceable mirrors. Such a transmitting or reflecting spatial light modulator 114 with an array of 540×480 pixels has sufficient resolution to impart, in each of S regions, one of the 2M+1 available topological charges in the set −M, −M+1, . . . −1, 0, +1, . . . +M−1, +M for the maximum allowed topological charge of M≈60. Note that a pixelated spatial light modulator 114 can impart either of the example cross sections 200 and 300 of FIGS. 2 and 3 onto a light beam or other electromagnetic beam.

The vortex beam is conveyed through free space or through the optional multimode optical fiber 112 from the source 110 to the vortex-sensing diffraction grating 120. By diffracting the vortex beam received from the source 110, the vortex-sensing diffraction grating 120 produces at section 2-2 an example diffraction pattern 400 of FIG. 4A. The example diffraction pattern 400 of FIG. 4A is a negative image with darker shading indicating higher light intensity that the vortex-sensing diffraction grating 120 is simulated to produce from the vortex beam having the example cross section 200 shown in FIG. 2.

As discussed below, the vortex-sensing diffraction grating 120 combines a vortex phase pattern and a linear phase pattern. Roughly, the vortex phase pattern of the vortex-sensing diffraction grating 120 produces focal spots each corresponding to a particular topological charge, and the linear phase pattern of the vortex-sensing diffraction grating 120 laterally separates these focal spots. The array 130 of photodetectors detects portions of the diffraction pattern and from the detected portions recovers the S selected topological charges included in the vortex beam.

Figure 4A:
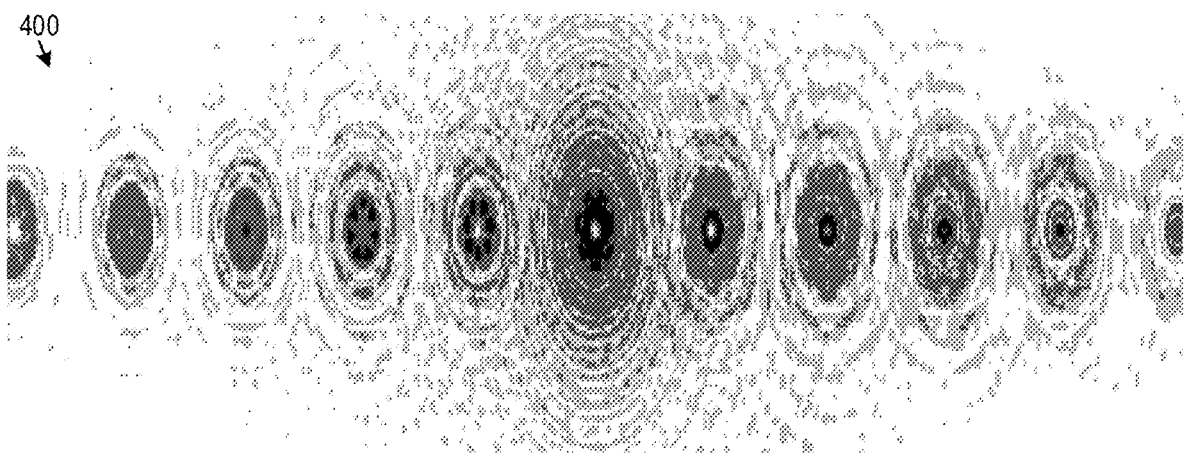
FIG. 4A is an example diffraction pattern that a vortex-sensing diffraction grating is simulated to produce from the vortex beam having the example cross section shown in FIG. 2.
Figure 4B:
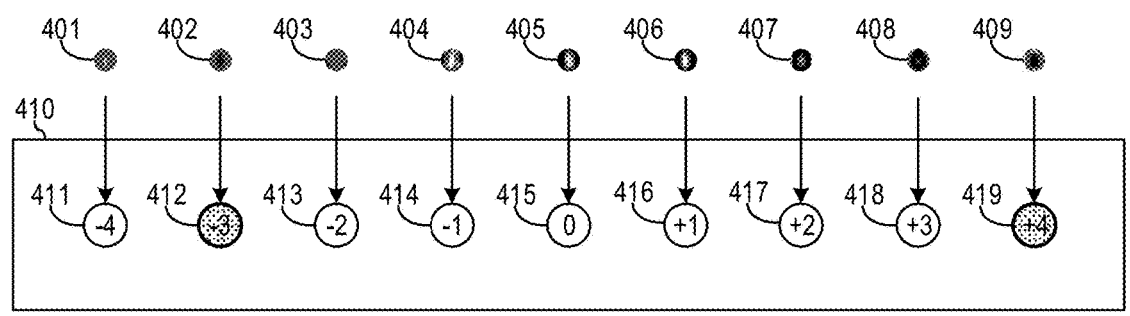
FIG. 4B shows the portions of the diffraction pattern of FIG. 4A from which the array of photodetectors recovers the selected topological charges included in the example cross section shown in FIG. 2.

FIG. 4B shows the focal portions 401 through 409 of the example diffraction pattern 400 of FIG. 4A from which the array 410 of photodetectors 411 through 419 recovers the S=2 selected topological charges included in the vortex beam with the example cross section 200 shown in FIG. 2. The array 410 of FIG. 4B corresponds to the array 130 of FIG. 1. The array 410 of photodetectors includes a respective photodetector 411 through 419 for each portion 401 through 409. For example, the array 410 includes photodetector 411 for portion 401 that corresponds, in this example, to the topological charge −4 at diffraction order −4.

Recall that the example cross section 200 shown in FIG. 2 is partitioned into the central circular region 210 conveying topological charge −3 and the concentric annular region 220 conveying topological charge +4. For topological charge −3, the photodetector 412 examines the portion 402 of the example diffraction pattern 400 and detects the topological charge −3 is included in the selected topological charges for the example cross section 200 because photodetector 412 detects presence of the electromagnetic energy at the central spot of the portion 402. Portion 402 includes the central spot (dark shade indicating high light intensity in the negative image of FIG. 4A-B) surrounded by a ring of lower intensity. Similarly, for topological charge +4, the photodetector 419 detects the topological charge +4 is included in the selected topological charges for the example cross section 200 because photodetector 419 detects presence of the electromagnetic energy at the central spot of the portion 409 relative to the surrounding ring. In summary, photodetectors 412 and 419 are highlighted in FIG. 4B to indicate that these photodetectors respectively detect topological charges −3 and +4 are included in the vortex beam having the example cross section 200 of FIG. 2.

In contrast, photodetectors 411, 414, 415, 416, 417, and 418 detect absence of electromagnetic energy at the central null surrounded by a ring of higher intensity of portions 401, 404, 405, 406, 407, and 408, respectively. The remaining photodetector 413 detects apparent ambiguity in FIG. 4B because the central spot and surrounding ring of portion 403 have similar intensities at the gray scale shown. However, this apparent ambiguity is resolved either with similar intensities between the central spot and the surrounding ring indicating the corresponding topological charge is not present, or through picking the best two portions 402 and 409 using the knowledge that the example cross section 200 includes exactly S=2 different selected topological charges.

Because the example cross section 300 of FIG. 3 includes the same selected topological charges −3 and +4 as the example cross section 200 of FIG. 2, the resulting diffraction pattern (not shown) would closely resemble the diffraction pattern 400 shown in FIG. 4A, even though the example cross section 300 of FIG. 3 has rearranged regions and subregions presenting these same selected topological charges. Generally, the detected topological charges indicate the presence, but not the actual placement, of these topological charges within the cross section of the vortex beam.

The S selected topological charges, which are selected from the available topological charges, typically change for each time interval. Thus, the array 410 of photodetectors 411 through 419 recovers the selected topological charges from the central spot or central null of the portions 401 through 409 of the diffraction pattern for the vortex beam during each time interval of the sequence of the time intervals. The source 100 encodes a symbol of data with the topological charges selected for each of the time intervals. The array 130 or 410 of the photodetectors recovers the symbol for each time interval from the selected topological charges recovered from the detected portions.

As mention above, the vortex-sensing diffraction grating 120 combines a vortex phase pattern and a linear phase pattern. In one embodiment, the vortex-sensing diffraction grating 120 combines the vortex phase pattern and the linear phase pattern in a product that multiplies the vortex phase pattern and the linear phase pattern. For example, the vortex-sensing diffraction grating 120 has a binary phase pattern having a phase delay of zero when the product is below a threshold and π radians when the product is above the threshold. The threshold is selected so that 70% of the binary phase pattern has a phase delay of zero and 30% of the binary phase pattern has a phase delay of π radians. The product equals the vortex phase pattern of $\exp(iL\varphi)$ times the linear phase pattern of $\exp(i\gamma X)$, where i is an imaginary number basis, L is a topological charge of the vortex phase pattern, $\varphi$ is a polar angle coordinate of the vortex phase pattern, $\gamma$ is a period of the linear phase pattern, and X is a Cartesian coordinate of the linear phase pattern.

In FIG. 4B, diffraction orders ranging between −4 to +4 are shown, and these correspond one-to-one with topological charges ranging between −4 to +4 as shown. However, this is due to the characteristics of the vortex-sensing diffraction grating 120 of FIG. 1. The vortex-sensing diffraction grating 120 shown in FIG. 1 has L=0.5, and this produces the one-to-one correspondence between the numerical values of the diffraction orders and the topological charges. However, parameter L is not restricted to the value L=0.5. Varying L shifts which topological charges correspond to the diffraction orders of the diffraction pattern.

As shown in FIG. 4A, the diffraction orders get weaker the farther away a particular diffraction order is from the zeroth diffraction order in the center of FIG. 4A. The previously mentioned 70%/30% ratio between the areas with a phase delay of zero and the areas with phase delay of π radians within the vortex-sensing diffraction grating 120 helps equalize the weaker outer diffraction orders as compared with a 50%/50% ratio, but still diffraction orders below about −4 and above about +4 become too weak for reliable detection. However, this hindrance is overcome by using multiple vortex-sensing diffraction gratings as discussed next.

Figure 5:
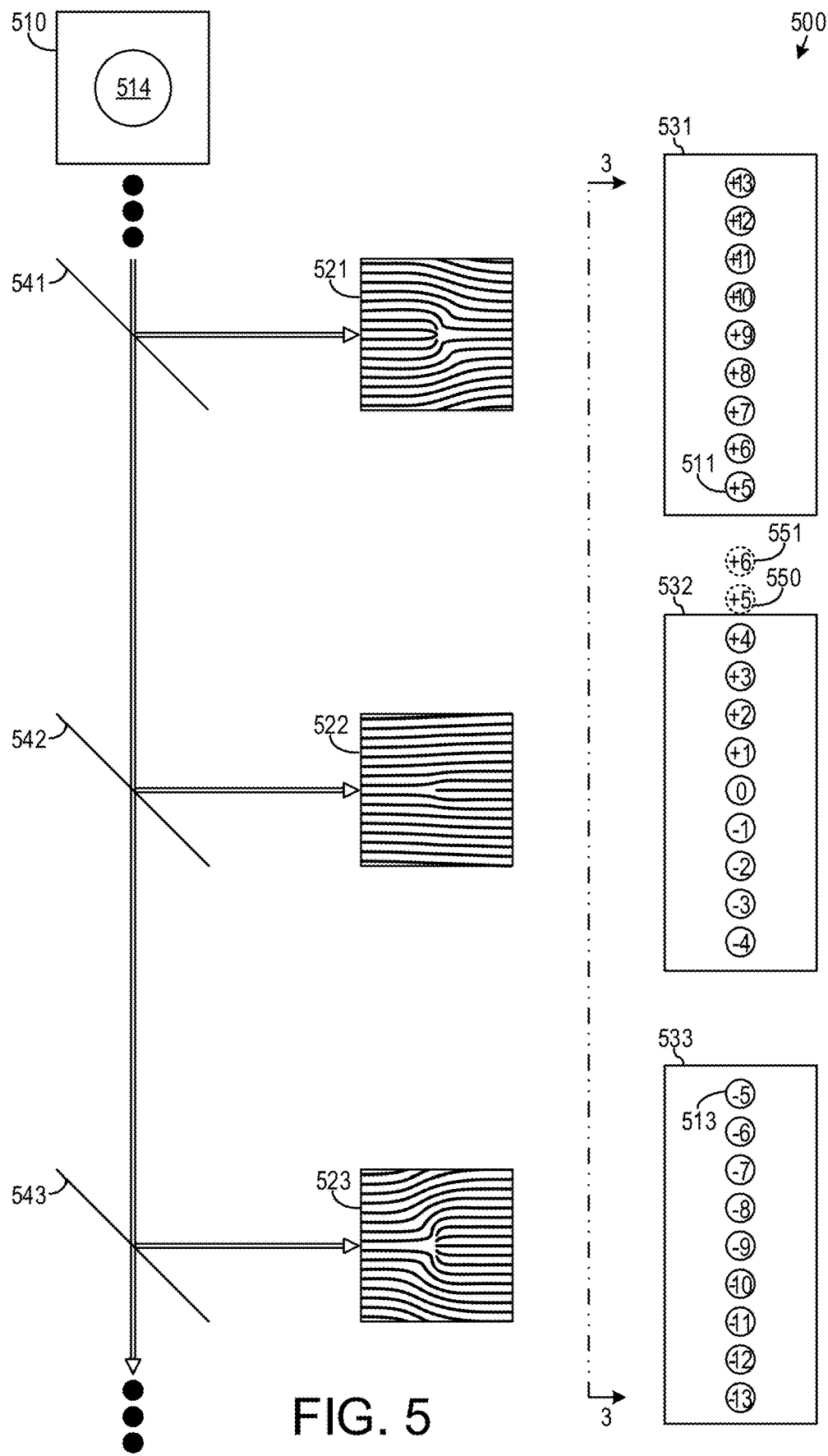
FIG. 5 is a block diagram of a system for electromagnetic communication with a vortex beam concurrently conveying multiple topological charges of orbital angular momentum in accordance with an embodiment of the invention.

FIG. 5 is a block diagram of a system 500 for electromagnetic communication with a vortex beam concurrently conveying multiple topological charges of orbital angular momentum in accordance with an embodiment of the invention. Because system 500 enables robust detection of more topological charges than system 100 of FIG. 1, many more combinations of topological charges are possible, and hence the symbol of data transmitted during each time interval concurrently encodes more binary bits of data into the S topological charges selected for each time interval.

A source 510 includes a spatial light modulator 514 that generates the vortex beam conveyed to an arrangement of beam splitters 541, 542, and 543. Typically, the beam splitters 541, 542, and 543 are disposed at a distance from the source 510 to form a segment of a telecommunications network. The beam splitters 541, 542, and 543 divide the vortex beam into fractions conveyed to the vortex-sensing diffraction gratings 521, 522, and 523.

The vortex-sensing diffraction gratings 521, 522, and 523 each combine a vortex phase pattern and a linear phase pattern in a product that multiplies the vortex phase pattern and the linear phase pattern. Collectively, the vortex-sensing diffraction gratings 521, 522, and 523 accumulate a total diffraction pattern at section 3-3 from diffracting the vortex beam received from the source 510. The arrays 531, 532, and 533 of photodetectors recover the selected topological charges in each time interval from the total diffraction pattern at section 3-3. It will be appreciated that the separate arrays 531, 532, and 533 of photodetectors can be considered a single array of photodetectors.

The operation of the middle vortex-sensing diffraction grating 522 and the middle array 532 of photodetectors is identical to the vortex-sensing diffraction grating 120 and the array 130 of FIG. 1. The array 532 of photodetectors detects presence of the topological charges −4, −3, −2, −1, 0, +1, +2, +3, and +4 in correspondingly numbered diffraction orders of the diffraction pattern from the vortex-sensing diffraction grating 522.

The operation of the vortex-sensing diffraction grating 521 and the array 531 of photodetectors is similar to the vortex-sensing diffraction grating 120 and the array 130 of FIG. 1, but the vortex-sensing diffraction grating 521 differs from the vortex-sensing diffraction grating 120. As shown in FIG. 5, the vortex-sensing diffraction grating 521 diffracts the vortex beam so the photodetector 511 at the diffractive order −4 detects the topological charge +5. Similarly, the remaining vortex-sensing diffraction grating 523 diffracts the vortex beam so the photodetector 513 at the diffractive order +4 detects the topological charge −5.

A parameter n scales the vortex-sensing diffraction gratings 521 and 523 relative to the vortex-sensing diffraction grating 522. Recall each vortex-sensing diffraction grating combines a vortex phase pattern and a linear phase pattern in a product that multiplies the vortex phase pattern and the linear phase pattern. To scale both the vortex phase pattern and the linear phase pattern in coordination, the product is the vortex phase pattern of exp(inLφ) times the linear phase pattern of exp(iγnX), where i is an imaginary number basis, n is the scaling factor, nL is a topological charge of the vortex phase pattern, φ is a polar angle coordinate of the vortex phase pattern, γn is a period of the linear phase pattern, and X is a Cartesian coordinate of the linear phase pattern. Benefits of coordinated scaling with scaling faction n include having the same pitch between the photodetectors in each of arrays 531, 532, and 533. Each of the vortex-sensing diffraction gratings 521, 522, and 523 has a binary phase pattern with a phase delay of zero when the product is below a threshold and π radians when the product is above the threshold.

An equation relating the scaling factor with the diffraction orders and the topological charge detected at that diffraction order is:

$$j = 2*n*L + m - 1$$

where j a particular diffraction order, n is the scaling factor, L is an unscaled topological charge of the vortex phase pattern, and m is a particular topological charge detected at the diffraction order j. Because the middle vortex-sensing diffraction grating 522 has n=1 and L=0.5, the above equation simplifies to j=m and this indicates the diffraction orders and detected topological charges are identically numbered as shown at the array 532 of photodetectors.

As shown in FIG. 5, the vortex-sensing diffraction grating 521 diffracts the vortex beam so the photodetector 511 at diffractive order j=−4 detects the topological charge m=+5. Solving for scaling factor n in the above equation yields n=−8. Thus, the scaled topological charge nL of the vortex phase pattern of the vortex-sensing diffraction grating 521 is nL=−4. Similarly, the vortex-sensing diffraction grating 523 diffracts the vortex beam so the photodetector 513 at diffractive order j=+4 detects the topological charge m=−5, yielding a scaling factor n=10 and a scaled topological charge nL=5 for the vortex-sensing diffraction grating 523.

Thus, when the set of available topological charges is fixed at J=2M+1 utilized topological charges, where M is the maximum absolute value of the allowed topological charges, then a number of the photodetectors in the array is J photodetectors, including a respective one of the J photodetectors for detecting each of the J utilized topological charges. When the number of available topological charges is variable, the number of photodetectors required equals the maximum value of the variable number of available topological charges. In one example, when the utilized topological charges range from −13 to M=13 shown in FIG. 5, there are fixed J=27 utilized topological charges and J=27 photodetectors. Given a number of the vortex-sensing diffraction gratings is N vortex-sensing diffraction gratings, then the array of photodetectors includes K photodetectors for each of the N vortex-sensing diffraction gratings, with these NK total photodetectors each detecting presence or absence of a respective one of the J=NK utilized topological charges. For example, when the number of the vortex-sensing diffraction gratings is N=3 as shown in FIG. 5, there are K=9 photodetectors for each vortex-sensing diffraction grating.

It will be appreciated that FIG. 5 is extended in another embodiment to include more vortex-sensing diffraction gratings and more photodetectors, and thereby utilize and detect more available topological charges. For example, the a vortex-sensing diffraction grating with corresponding photodetectors could be added above and below the vortex-sensing diffraction gratings 521, 522, and 523 and the arrays 531, 532, and 533 of photodetectors, thereby increasing the utilized topological charges to J=45 utilized topological charges. Appropriate beam spitting is also needed and could include a balanced binary tree of half-silvered mirrors.

A modified embodiment compensates for the weakness of the wider diffractive orders from each vortex-sensing diffraction grating. Referring to FIG. 5, array 532 is expanded to include photodetector 550. Thus, topological charge +5 is detected by both photodetector 550 and photodetector 511. Further extension includes photodetector 551. Not shown is extension of array 531 toward array 532 and extensions between arrays 532 and 533. The double detection compensates for the weakness of the wider diffractive orders. With careful alignment of system 500, such double detection does not require additional photodetectors when the electromagnetic energy of the +5 diffraction order from vortex-sensing diffraction grating 522 overlaps at photodetector 511 with the electromagnetic energy from the −4 diffraction order from vortex-sensing diffraction grating 521.

The unique combinations possible in each time interval is C=J!/[S!(J−S)!] unique combinations possible throughout the time interval, where the set of available topological charges is fixed at J utilized topological charges and the respective number of the selected topological charges in each time interval is fixed at S distinct topological charges selected from the J utilized topological charges. Thus, the vortex beam conveys a symbol for each time interval and the symbol contains and concurrently conveys $\log_2 C$ binary bits of information. For example, when the J utilized topological charges are twenty-seven utilized topological charges as shown in FIG. 5 and the S distinct topological charges in each time interval are five distinct topological charges (not shown) selected from the twenty-seven utilized topological charges, then the unique combinations possible in each time interval are C=80,730 unique combinations and the vortex beam concurrently conveys more than sixteen binary bits of information in each time interval.

From the above description of Electromagnetic Communication with a Vortex Beam Concurrently Conveying Multiple Topological Charges, it is manifest that various techniques may be used for implementing the concepts of systems 100 and 500 without departing from the scope of the claims. The described embodiments are to be considered in all respects as illustrative and not restrictive. The systems disclosed herein may be practiced in the absence of any element that is not specifically claimed and/or disclosed herein. It should also be understood that system 100 or 500 is not limited to the particular embodiments described herein, but is capable of many embodiments without departing from the scope of the claims.

We claim:

1. A system for electromagnetic communication with a vortex beam concurrently conveying multiple topological charges of orbital angular momentum, the system comprising:
    a source for generating the vortex beam concurrently conveying a respective number of selected topological charges during each of a plurality of time intervals, the selected topological charges for each time interval selected from a set of available topological charges;
    at least one vortex-sensing diffraction grating combining a vortex phase pattern and a linear phase pattern, the vortex-sensing diffraction grating producing a diffraction pattern from diffracting the vortex beam received from the source; and an array of photodetectors for detecting a plurality of portions of the diffraction pattern and from the detected portions recovering the selected topological charges in each time interval.

2. The system of claim 1, wherein:
the source encodes a symbol of data with the selected topological charges selected for each of the time intervals; and
the array of the photodetectors recovers the symbol for each time interval from the selected topological charges recovered from the detected portions.

3. The system of claim 1, wherein:
the source includes a spatial light modulator having a plurality of regions each providing one of the available topological charges during each of the time intervals; and
the respective number of selected topological charges for each of the time intervals is fixed at a number of the regions of the spatial light modulator.

4. The system of claim 3, wherein:
the vortex beam is collimated with a circular cross section at the spatial light modulator; and
the circular cross section at the spatial light modulator is partitioned into the regions, which are a central circular region and at least one concentric annular region surrounding the central circular region.

5. The system of claim 4, wherein:
the spatial light modulator encodes a symbol of data with the selected topological charges provided within each of the regions for each of the time intervals; and
the array of the photodetectors recovers the symbol for each time interval from the selected topological charges recovered from the detected portions.

6. The system of claim 1, wherein the vortex-sensing diffraction grating combines the vortex phase pattern and the linear phase pattern in a product that multiplies the vortex phase pattern and the linear phase pattern.

7. The system of claim 6, wherein the vortex-sensing diffraction grating has a binary phase pattern having a phase delay of zero when the product is below a threshold and $\pi$ radians when the product is above the threshold, the product equaling the vortex phase pattern of $\exp(iL\varphi)$ times the linear phase pattern of $\exp(i\gamma X)$, where $i$ is an imaginary number basis, $L$ is a topological charge of the vortex phase pattern, $\varphi$ is a polar angle coordinate of the vortex phase pattern, $\gamma$ is a period of the linear phase pattern, and $X$ is a Cartesian coordinate of the linear phase pattern.

8. The system of claim 1, wherein the at least one vortex-sensing diffraction grating is a plurality of vortex-sensing diffraction gratings, each combing the vortex phase pattern and the linear phase pattern in a product that multiplies the vortex phase pattern and the linear phase pattern, the plurality of vortex-sensing diffraction gratings collectively producing the diffraction pattern from diffracting the vortex beam received from the source.

9. The system of claim 8, wherein each of the plurality of vortex-sensing diffraction gratings has a binary phase pattern having a phase delay of zero when the product is below a threshold and $\pi$ radians when the product is above the threshold, the product equaling the vortex phase pattern of $\exp(inL\varphi)$ times the linear phase pattern of $\exp(i\gamma nX)$, where $i$ is an imaginary number basis, $n$ is a scaling factor, $nL$ is a topological charge of the vortex phase pattern, $\varphi$ is a polar angle coordinate of the vortex phase pattern, $\gamma n$ is a period of the linear phase pattern, and $X$ is a Cartesian coordinate of the linear phase pattern.

10. The system of claim 9, wherein the set of available topological charges is fixed at J utilized topological charges, and a number of the photodetectors in the array is J photodetectors, including a respective one of the J photodetectors for each of the J utilized topological charges.

11. The system of claim 10, wherein a number of the plurality of vortex-sensing diffraction gratings is N vortex-sensing diffraction gratings, and the array of photodetectors includes K photodetectors for each of the N vortex-sensing diffraction gratings, with these NK total photodetectors each detecting presence or absence of a respective one of the J=NK utilized topological charges.

12. The system of claim 11, wherein:
each portion of the portions of the diffraction pattern corresponds to a particular topological charge of the available topological charges;
the portion of the diffraction pattern includes the presence of a central spot of electromagnetic energy during each time interval of the time intervals when the selected topological charges for the time interval include the particular topological charge to which the portion corresponds; and
the portion of the diffraction pattern includes the absence, which is a central null, during each time interval of the time intervals when the selected topological charges for the time interval do not include the particular topological charge to which the portion corresponds.

13. The system of claim 12, wherein:
the source encodes a symbol of data with the selected topological charges selected for each of the time intervals; and
the array of the photodetectors recovers the symbol for each time interval from the presence of the central spot of the electromagnetic energy or the absence of the electromagnetic energy at the central null within each of the portions of the diffraction pattern from the vortex-sensing diffraction gratings.

14. The system of claim 1, wherein:
each portion of the portions of the diffraction pattern corresponds to a particular topological charge of the available topological charges;
the portion of the diffraction pattern includes a central spot of electromagnetic energy during each time interval of the time intervals when the selected topological charges for the time interval include the particular topological charge to which the portion corresponds; and
the portion of the diffraction pattern includes a central null during each time interval of the time intervals when the selected topological charges for the time interval do not include the particular topological charge to which the portion corresponds.

15. The system of claim 14, wherein:
the array of photodetectors includes a respective photodetector for each portion of the portions with the portion corresponding to the particular topological charge;
the respective photodetector for each portion detects the particular topological charge is included in the selected topological charges for each time interval of the time intervals when the respective photodetector detects presence of the electromagnetic energy of the central spot of the portion during the time interval; and the respective photodetector for each portion detects the particular topological charge is not included in the selected topological charges for each time interval of the time intervals when the respective photodetector detects absence of the electromagnetic energy at the central null of the portion during the time interval.

16. The system of claim 15, wherein:

the source encodes a symbol of data with the selected topological charges selected for each of the time intervals; and the array of the photodetectors recovers the symbol for each time interval from the presence of the electromagnetic energy of the central spot or the absence of the electromagnetic energy at the central null within each of the portions of the diffraction pattern.

17. The system of claim 1, further comprising a multimode optical fiber conveying the vortex beam from the source to the vortex-sensing diffraction grating, which is disposed at a distance from the source.

18. The system of claim 1, wherein the respective number of the selected topological charges for each time interval is at least two selected topological charges for at least one of the plurality of time intervals.

19. The system of claim 1, wherein a plurality of unique combinations possible in each time interval is $C=J!/[S!(J-S)!]$ unique combinations possible throughout the time interval, where the set of available topological charges is fixed at J utilized topological charges and the respective number of the selected topological charges in each time interval is fixed at S distinct topological charges selected from the J utilized topological charges, such that the vortex beam concurrently conveys $\log_2 C$ binary bits of information in each time interval.

20. The system of claim 19, wherein the J utilized topological charges are twenty-seven utilized topological charges and the S distinct topological charges in each time interval are five distinct topological charges selected from the twenty-seven utilized topological charges, such that the unique combinations possible in each time interval are C=80,730 unique combinations and the vortex beam concurrently conveys more than sixteen binary bits of information in each time interval.

* * * * *